(12) United States Patent
Papadopoli et al.

(10) Patent No.: US 8,453,996 B1
(45) Date of Patent: Jun. 4, 2013

(54) WHEEL-ANCHORED DISPLAY BARRIER

(71) Applicants: George Papadopoli, Forest Grove, OR (US); Andrea Papadopoli, Forest Grove, OR (US)

(72) Inventors: George Papadopoli, Forest Grove, OR (US); Andrea Papadopoli, Forest Grove, OR (US)

(*) Notice: Subject to any disclaimer, the term of this patent is extended or adjusted under 35 U.S.C. 154(b) by 0 days.

(21) Appl. No.: 13/666,044

(22) Filed: Nov. 1, 2012

(51) Int. Cl.
*A01G 17/06* (2006.01)

(52) U.S. Cl.
USPC ............... 256/23; 135/88.06; 403/61

(58) Field of Classification Search
USPC ...... 256/1, 65.14, 23, 40, DIG. 2, 37; 403/53, 403/57, 58, 59, 60, 61, 97, 98, 116, 117, 403/82; 248/121, 122.1, 124.1, 125.7, 125.8, 248/125.9, 126, 419; 242/408, 398, 404, 242/404.2, 406; 135/88.06
See application file for complete search history.

(56) References Cited

U.S. PATENT DOCUMENTS

| | | | | |
|---|---|---|---|---|
| 2,989,967 A * | 6/1961 | Lee | ............................. | 135/88.13 |
| 3,782,766 A * | 1/1974 | Teel | ............................. | 293/117 |
| 4,524,953 A * | 6/1985 | Phillips et al. | ................... | 256/23 |
| 4,605,030 A * | 8/1986 | Johnson | ..................... | 135/88.06 |
| 4,655,236 A * | 4/1987 | Dorame et al. | ............. | 135/88.06 |
| 4,944,321 A * | 7/1990 | Moyet-Ortiz | .............. | 135/88.06 |
| 4,991,363 A * | 2/1991 | Randmae | ....................... | 52/2.11 |
| 5,158,103 A * | 10/1992 | Leu | ............................. | 135/88.06 |
| 5,241,977 A * | 9/1993 | Flores et al. | ............... | 135/88.06 |
| 5,295,500 A * | 3/1994 | Leu | ............................. | 135/88.06 |
| 5,588,630 A * | 12/1996 | Chen-Chao | .................. | 248/514 |
| 5,850,843 A * | 12/1998 | Mahood et al. | ............ | 135/88.06 |
| 5,911,399 A * | 6/1999 | Mannion | ....................... | 248/514 |
| 6,035,874 A * | 3/2000 | Po-Chang | ................. | 135/88.06 |
| 6,089,246 A * | 7/2000 | Barnes | ....................... | 135/88.06 |
| 7,172,234 B2 * | 2/2007 | Chang | ........................ | 296/95.1 |
| 7,273,154 B1 * | 9/2007 | Edwards | ................. | 211/119.01 |
| 2008/0053504 A1 * | 3/2008 | Al-Mutairi | ................. | 135/88.06 |
| 2009/0250673 A1 * | 10/2009 | Menzel | ........................... | 256/10 |
| 2011/0266383 A1 * | 11/2011 | Cohen et al. | .................. | 242/171 |

* cited by examiner

*Primary Examiner* — Michael P Ferguson
*Assistant Examiner* — Daniel Wiley
(74) *Attorney, Agent, or Firm* — Mark S. Hubert

(57) ABSTRACT

A compact, collapsible, wheel-anchored display barrier is anchored to the ground via the wheel of an automobile. The barrier post is a pivotable, telescoping arm that can be swiveled then locked about a 180° arc to allow the barrier to accommodate different sized vehicles. When a barrier is positioned under each vehicle tire, a retractable lanyard extends from the top of each telescoping arm and is connect to the telescoping arm of the adjacent barrier, located at the adjacent wheel.

9 Claims, 7 Drawing Sheets

WHEEL-ANCHORED DISPLAY BARRIER

BACKGROUND OF THE INVENTION

Nowhere is Americans' love of the automobile more enthusiastically displayed than the weekend auto show. These are not the auto shows that draw international exhibitors, or that are featured on primetime news hours. Instead, local auto clubs, whether in big cities or small towns, sponsor weekend events that showcase their members' pride-and-joy, from antique automobiles, to muscle cars, to hard-to-find imports, the weekend auto show provides the opportunity for local car collectors, restorers, and car enthusiasts to display their work and generally celebrate their collective love of cars.

No matter how big or how small, space is often at a premium at auto shows, with organizers trying to accommodate what often amounts to too many vehicles in too little space. As a result, with such limited space, there is no chance for exhibiters to employ a protective perimeter around their vehicles leaving their hard work (and money) exposed to overzealous attendees and those attendees' pets, children, and baby strollers.

SUMMARY OF THE INVENTION

The present invention is a wheel-anchored display barrier. The wheel-anchored display barrier is anchored to the ground via the wheel of the automobile being displayed. The barrier post are telescoping, can be swiveled and then locked about a 180° arc to accommodate different sized vehicles, and is pivotable. Additionally, the barrier lanyard is retractable, making the wheel-anchored display barrier of the present invention, easy to store, transport, and employ.

DETAILED DESCRIPTION

In the following detailed description, reference is made to the accompanying drawings, which form a part hereof wherein like numerals designate like parts throughout, and in which is shown by way of illustration a specific embodiment in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Figure 1:
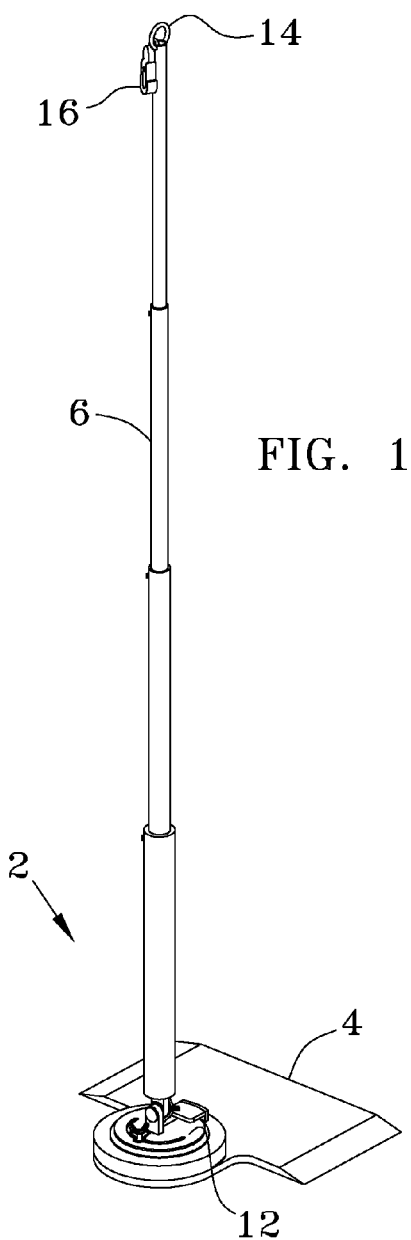
FIG. 1 is a perspective view of the wheel-anchored display barrier of the present invention, wherein the telescoping arm is fully extended and in an upright configuration.
Figure 2:
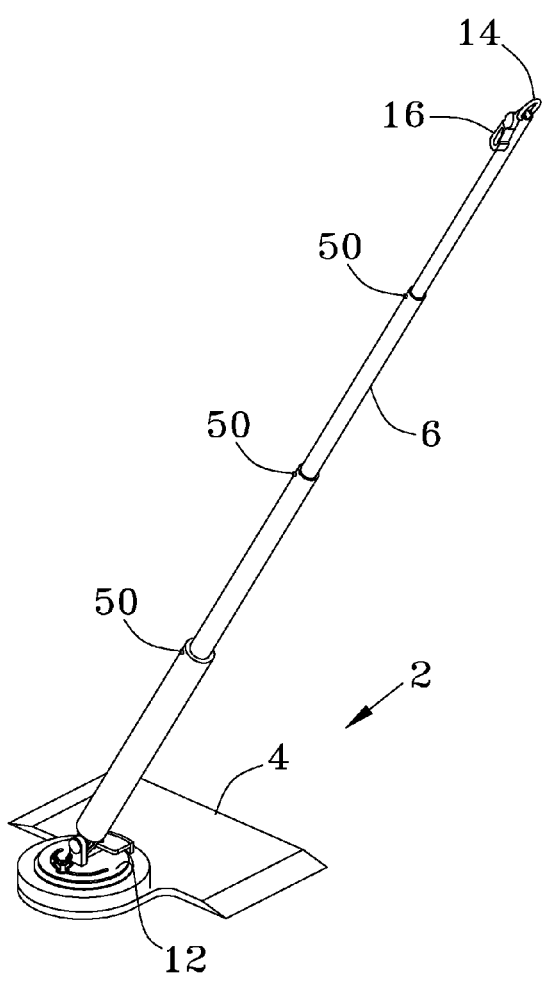
FIG. 2 is a perspective view of the wheel-anchored display barrier of the present invention, wherein the telescoping arm is fully extended and is in a tilted configuration.
Figure 3:
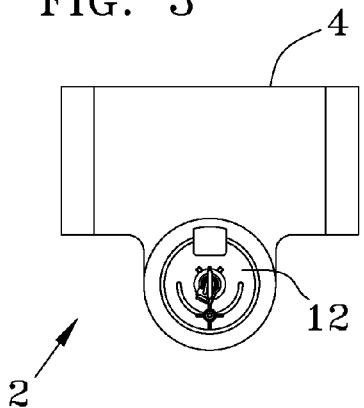
FIG. 3 is a top view of the wheel-anchored display barrier of the present invention.
Figure 4:
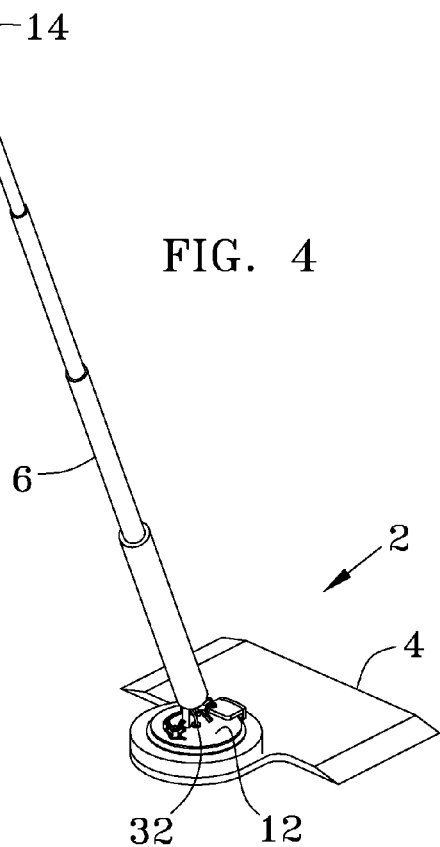
FIG. 4 is a perspective view of the wheel-anchored display barrier of the present invention; wherein the telescoping arm has been rotated and tilted.

FIGS. 1, 2, and 4 are perspective views, and FIG. 3 is a top view of a wheel-anchored display barrier 2 in accordance with an embodiment of the present invention. The wheel-anchored display barrier 2 comprises a base member 4, telescoping arm 6, lanyard housing and refraction means 8 (See FIG. 5), lanyard 10 (See FIG. 5), rotation disk 12, attachment ring 14, and attachment fixture 16.

Figure 12:
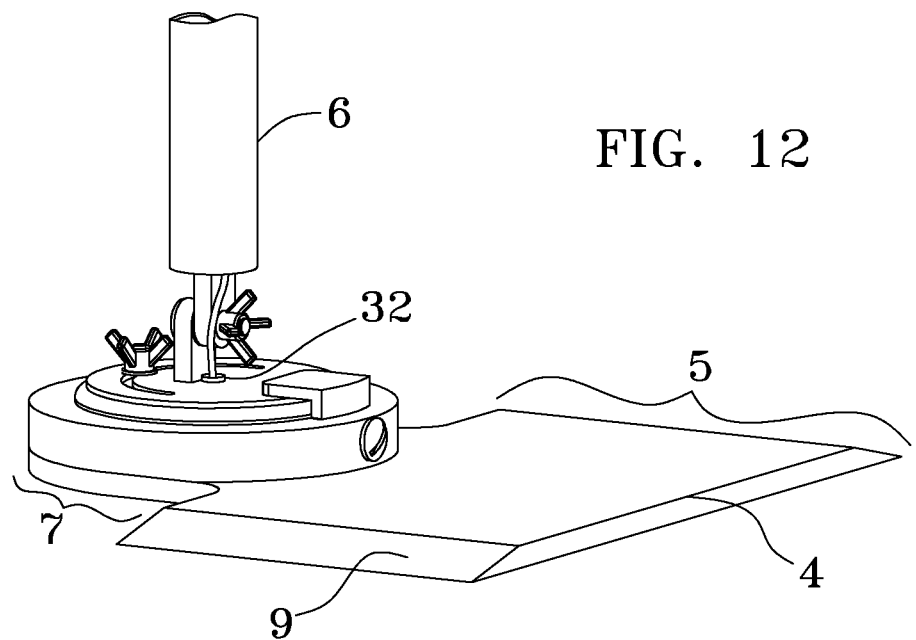
FIG. 12 is a back perspective view of the wheel-anchored display barrier of the present invention, wherein the telescoping arm has been cut (shortened) for visual clarity.

Turning to FIG. 12, it can be seen that base member 4, has a generally rectangular, planar section 5, and a rounded section 7. Rectangular, planar section 5 has tapered ends 9 to facilitate driving the tires of an automobile onto, or off of, the rectangular, planar section 5 of base member 4.

Figure 5:
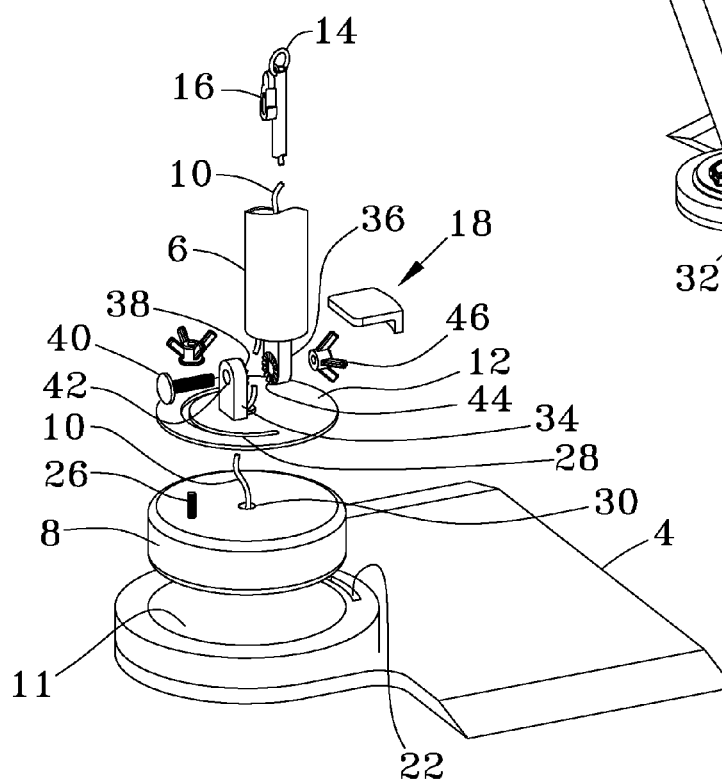
FIG. 5 is a partially exploded view of the wheel-anchored display barrier of the present invention, wherein the telescoping arm has been cut (shortened) for visual clarity.
Figure 13:
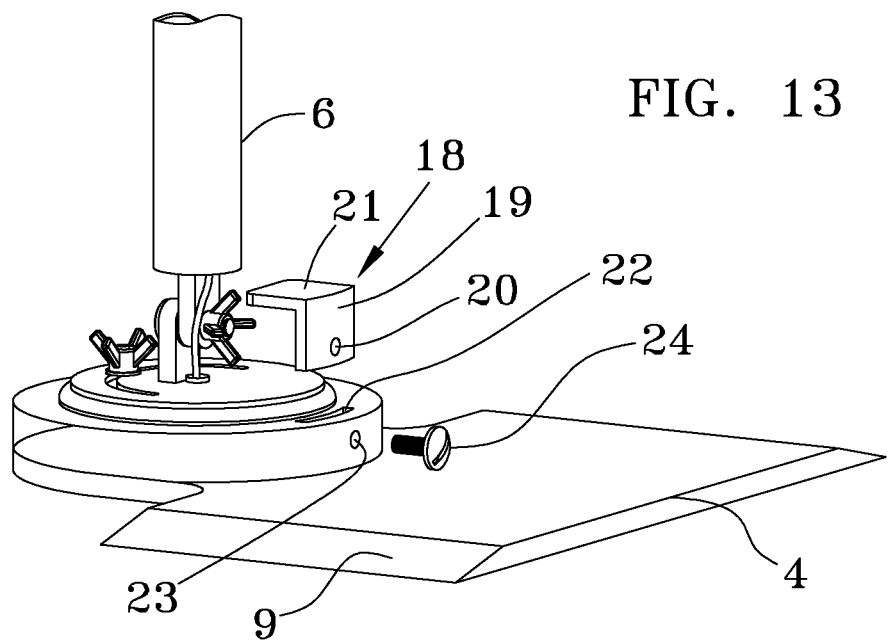
FIG. 13 is a back perspective, partial exploded view of the wheel-anchored display barrier of the present invention, wherein the telescoping arm has been cut (shortened) for visual clarity.

Rounded section 7 houses lanyard housing and retraction means 8, as is illustrated in FIG. 13. Lanyard housing and retraction means 8, is simply placed inside cavity 11 of rounded section 7 as illustrated in FIG. 5. FIG. 13 illustrates how a reel housing is secured within cavity 11 of rounded section 7. Reel retention tab 18 could generally be described as "L-shaped," in that it comprises two portions joined at 90'; although, its orientation as employed in the present invention is that of an inverted "L." First portion 19, of reel retention tab 18, is designed for mating engagement with retention slot 22. First portion 19 also contains tab orifice 20, which aligns with edge orifice 23, located about a peripheral edge of rounded section 7, when first portion 19 is inserted into retention slot 22. Mechanical fastener 24 fastens retention tab 18 via passing through edge orifice 23 and tab orifice 20. When first portion 19, of reel retention tab 18, is fastened via fastener 24, second portion 21 of retention tab 18 resides above rotation disk 12 as shown in FIG. 12, aiding in securing lanyard housing and retraction means 8 within cavity 11. This is accomplished by the frictional engagement of the outer faces of the lanyard housing and refraction means 8 with the reel retention tab 18 and the faces of the rounded section 7 that define the cavity 11.

In the illustrated embodiment, the internal chamber of lanyard housing and retraction means 8 contains a self-winding reel (not shown) of which is wound a lanyard 10. As is well known in the art, one end of the lanyard 10 is connected to the reel periphery, while the free end terminates through the peripheral edge of the reel housing 8 in an attachment fixture 16. The self-winding reel includes a spiral spring, which allows the lanyard 10 to be extended away from the housing and rapidly retracted back into to the housing upon its release. Although not illustrated, a locking mechanism to stop the self-winding reel, as is well known in the art is also within the housing. Lanyard housing and retraction means 8 is cylindrical in shape as is common for reel or spool housings to reflect the cylindrical shape of the reel or spool they house. While a self-winding reel is illustrated herein as the retraction means, it is well known that other retraction means could be employed without departing from the scope of the present invention. For example, a reel with a hand-crank for winding the lanyard could be employed. Additionally, while "lanyards" are typically thought of as "ropes" or "cords," a fabric or plastic ribbon could also be employed as the attachment means.

Turning now to FIG. 5, positioning peg 26 extends normally from the top face of lanyard housing and retraction means 8. Position peg 26 engages the 180° arced slot 28, which extends through disk 12. Position peg 26, 180° arced slot 28, and rotation disk 12 work in concert to form a rotation means about which telescoping arm 6 can be rotated or swiveled. Disk orifice 32 extends through disk 12 allowing for the passing of lanyard 10 therethrough (See FIG. 4). Lanyard 10 extends from the reel (not illustrated) through reel housing orifice 30, and then through disk orifice 32 (see FIG. 11), before extending though telescoping arm 6 and terminating in an attachment fixture 16. It should be understood that different mechanical configurations could achieve the function of the "rotation means" without departing from the scope of the present invention.

Figure 6:
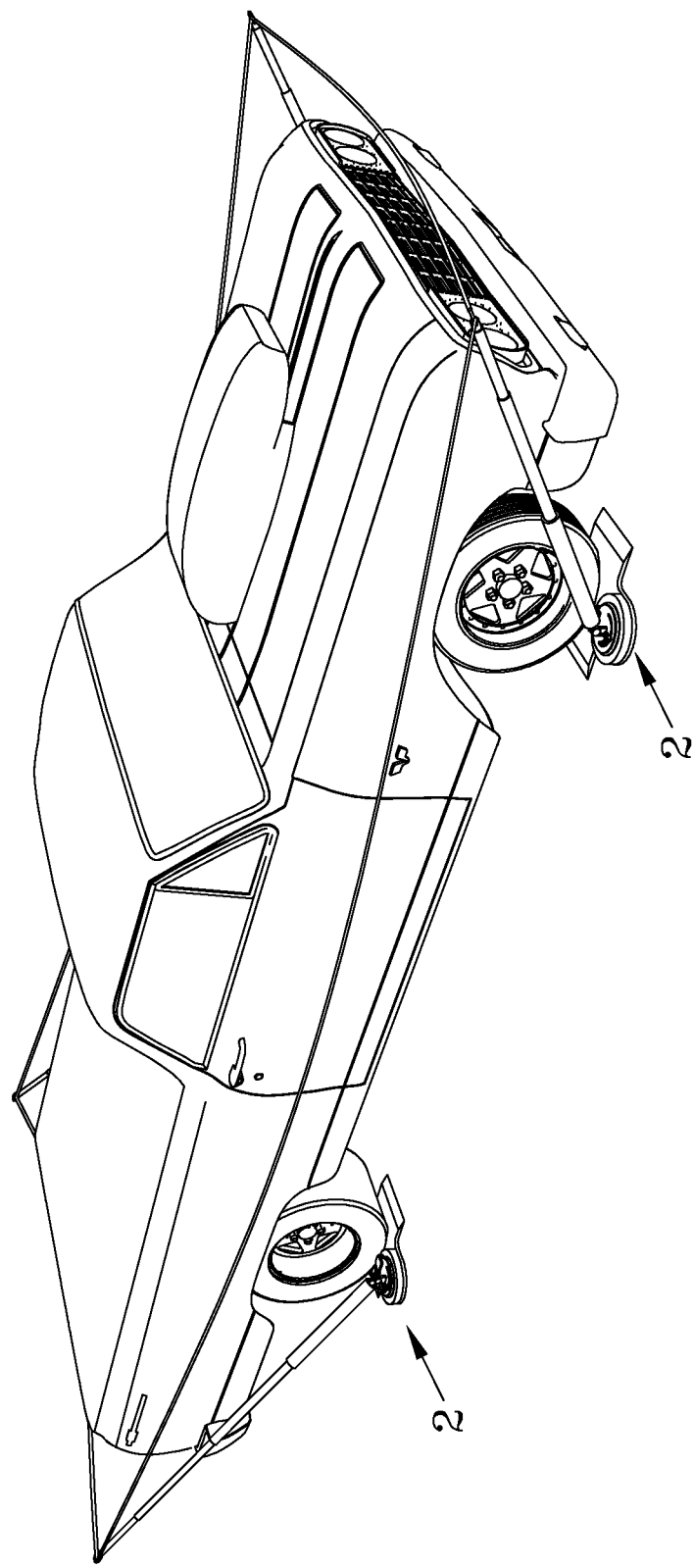
FIG. 6 is a perspective view of an automobile, on which the wheel-anchored display barrier of the present invention has been employed.
Figure 7:
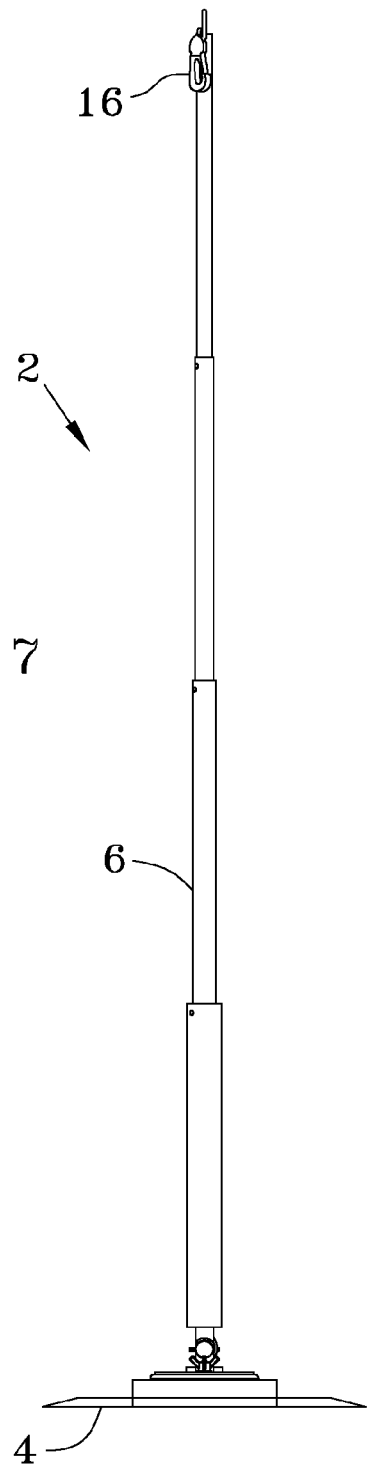
FIG. 7 is a front view of the wheel-anchored display barrier of the present invention, wherein the telescoping arm is fully extended.
Figure 8:
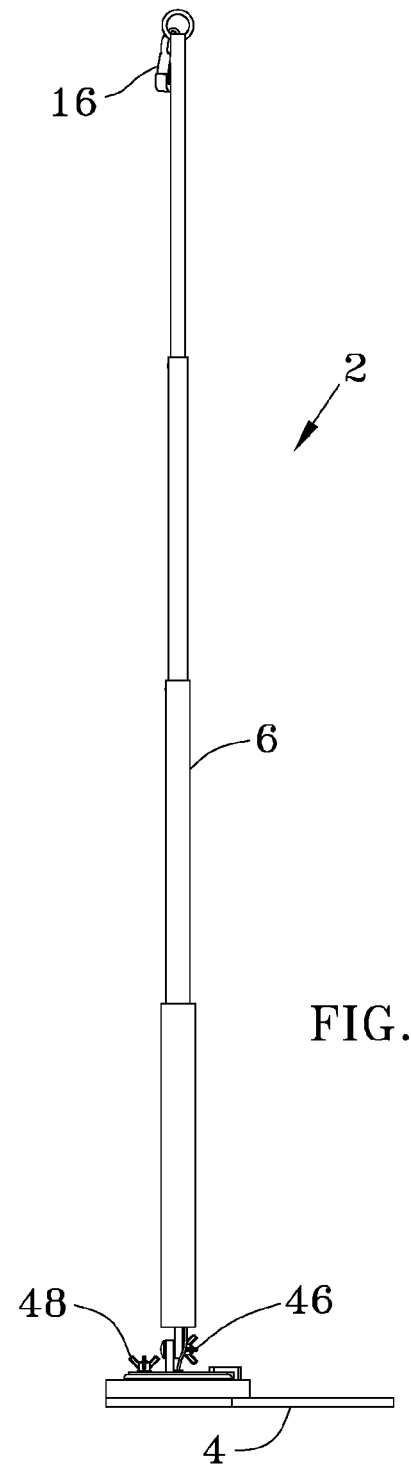
FIG. 8 is a side view of the wheel-anchored display barrier of the present invention, wherein the telescoping arm is fully extended.

Extending normally from the top face of disk 12 and residing adjacent to both disk orifice 32 and arced slot 28 is disk first mounting member 34. First mounting member 34 is designed for toothed-mating engagement with second mounting member 36 extending from telescoping arm 6. First mounting member 34 and second mounting member are designed to work together as a pivot means, allowing telescoping arm 6 to be locked at an appropriate angle depending on the circumstances of use. For example as illustrated in FIG. 6, if a large car is being barricaded, the telescoping arm 6 will need to be fully extended and locked at an acute (or obtuse) angle as measured from base 4. Should a small car require barricading such as a Fiat (not illustrated), the telescoping arm 6 might be locked in an upright (90°) position.

Figure 9:
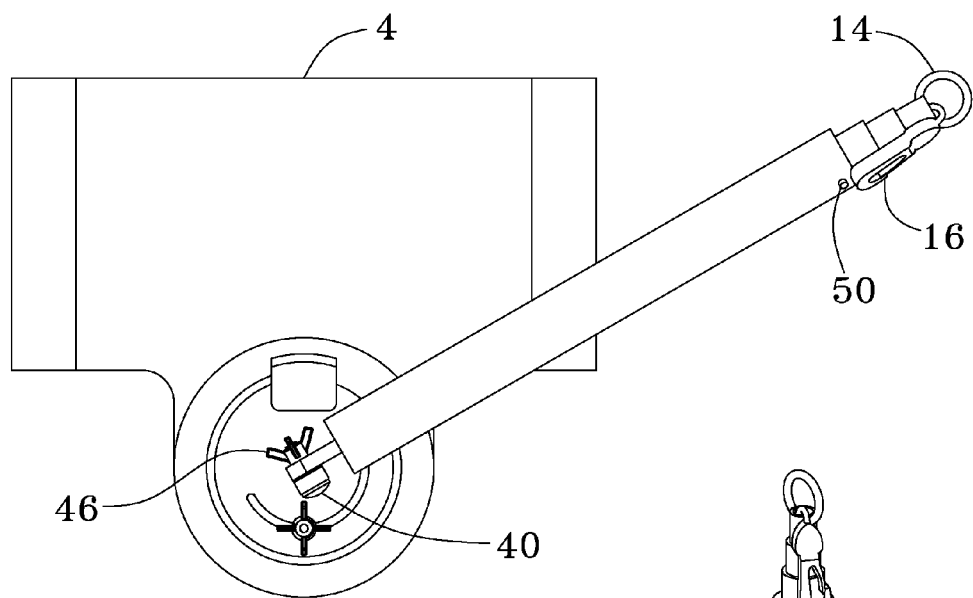
FIG. 9 is a top view of the wheel-anchored display barrier of the present invention, wherein the telescoping arm is fully retracted, rotated, and tilted.
Figure 10:
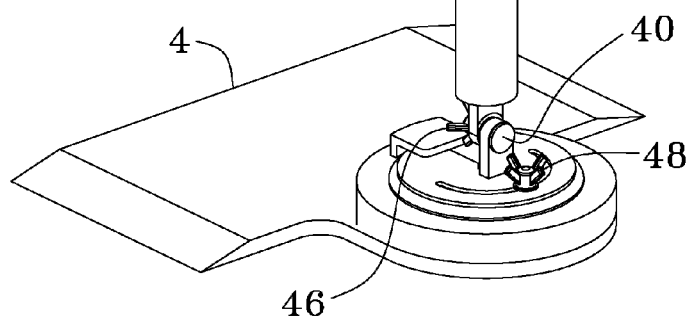
FIG. 10 is a perspective view of the wheel-anchored display barrier of the present invention, wherein the telescoping arm is fully retracted, and in an upright position.

Angle adjustment of telescoping arm 6 is achieved through mounting teeth 38 located on both first mounting member 34 and second mounting member 36, illustrated in FIG. 5. As is well known in the art mounting teeth 38 lock together in an overlapping sunburst pattern. Once an optimal angle has been selected, bolt 40 is inserted through first mounting orifice 42 and second mounting orifice 44, and finally first wingnut 46 is engaged onto bolt 40 to lock the angle, as shown in FIGS. 9 and 10. It should be understood that different mechanical configurations could achieve the function of the "pivot means" without departing from the scope of the present invention.

Figure 11:
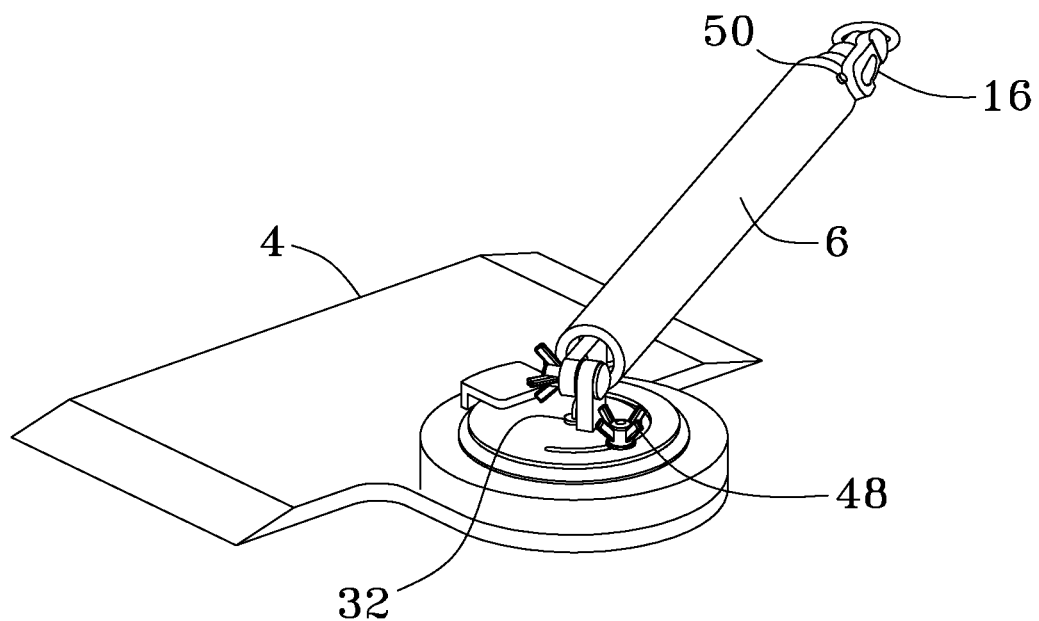
FIG. 11 is a perspective view of the wheel-anchored display barrier of the present invention, wherein the telescoping arm is fully retracted, rotated, and tilted.

Looking at FIG. 11, it can be seen that rotation disk is locked on position peg 26 via second wingnut 48. Also visible in FIG. 11 is the locking tab 50 located on each section of telescoping arm 6 as, in well know in the art. As telescoping arm 6 is extended locking tab 50 automatically locks. When the user is ready to retract telescoping arm 6 for storage, he simply presses on locking tab 50, while sliding arm 6 towards base 4. Telescoping arm terminates in an attachment ring 14, which is designed for engagement with attachment fixture 16.

FIG. 6 shows wheel-anchored display barrier 2 in use. For best results, four wheel-anchored display barriers 2 are placed in front (or behind) each wheel of a car. The car is then driven onto the barriers 2, such that each wheel of the car resides on top of rectangular, planar section 5 of base 4. Telescoping arm 6 is locked into the appropriate angle via bolt 40 and first wingnut 46. Telescoping arm 6 is then extended and lanyard 10 is extending to and locked on, via attachment fixture 16, to attachment ring 14 of the adjacent telescoping arm 6 of the wheel-anchored display barrier 2 located at the adjacent car wheel. Ideally, the user will determine the ideal positioning of the rotation disk 12 for his car before attending an auto show to eliminate the need to assemble display barrier 2 before each use. The user should not have to insert the reel housing 8 into cavity 11, position rotation disk 12 over reel housing 8, and secure disk 12 via position peg 26 and second wing nut 48, and secure housing 8 via retention tab 18, prior to each use. Designed for ease of use, wheel-anchored display barrier 2 is designed that lanyard housing and retraction means 8 and disk 12 only need to be secured to base 4 once. After the initial positioning, the user only needs to contend with telescoping arm 6, when he is ready to barricade his car. Obviously, should the user decide to barricade a different car, he may have to reposition (reassemble) the reel housing 8 and rotation disk 12 to base 4 as previously discussed.

Although a specific embodiment has been illustrated and described herein, it will be appreciated by those of ordinary skill in the art that a wide variety of alternate and/or equivalent implementations calculated to achieve the same purposes may be substituted for the specific embodiment shown and described without departing from the scope of the present invention. Therefore, it is intended that this invention be limited only by the claims and the equivalents thereof.

The invention claimed is:

1. A wheel anchored display barrier comprising:
   a base comprising a recess formed in a top surface thereof;
   a lanyard housing comprising a bottom face and an opposing top face, said bottom face disposed in said recess of said base, said lanyard housing containing a self-winding reel substantially centered within said lanyard housing and defining a vertical first axis, wherein a retractable lanyard is wound around said reel, said retractable lanyard being extensible from within said lanyard housing through a housing orifice, said lanyard housing further comprising a positioning peg extending normally from said top face thereof;
   an arm rotation assembly comprising a circular disk with a lower surface and an opposing upper surface, wherein said lower surface is slidably engaged with said top face of said lanyard housing, said disk further comprising an orifice extending therethrough for passage of said retractable lanyard, and further comprising an arced slot extending therethrough for receiving said positioning peg, said disk being centered on and rotatable about said first axis;
   an arm pivot assembly, said arm pivot assembly comprising a lower pivot arm affixed to said upper surface of said disk, and an upper pivot arm pivotably connected to said lower pivot arm about a bolt extending through said upper and lower pivot arms, said bolt defining a second axis substantially perpendicular to said first axis;
   a telescoping arm comprising a plurality of tube sections, wherein a lower end of an outermost tube section is attached to said upper pivot arm of said arm pivot assembly, said retractable lanyard being extensible through said telescoping arm;
   an attachment ring affixed to an end of said retractable lanyard; and
   an attachment fixture affixed to an upper end of an innermost tube of said telescoping arm, said attachment fixture configured to engage with an attachment ring of a retractable lanyard of an adjacent barrier.

2. The wheel anchored display barrier of claim 1 wherein said base further comprises a planar first section and a rounded second section, wherein said recess is formed in said rounded second section.

3. The wheel anchored display barrier of claim 2 wherein said planar first section further comprises tapered ends.

4. The wheel anchored display barrier of claim 1 wherein said lower pivot arm of said arm pivot assembly comprises a first toothed surface formed on a first vertical face of said lower pivot arm, said first toothed surface further including a first mounting orifice formed therethrough concentric with said second axis and receiving said bolt.

5. The wheel anchored display barrier of claim 4 wherein said rounded second section further comprises a retention tab for retaining said lanyard housing within said base.

6. The wheel anchored display barrier of claim 4 wherein said upper pivot arm of said arm pivot assembly comprises a second toothed surface formed on a second vertical face of said upper pivot arm, said second toothed surface rotatably engaged with said first toothed surface, said second toothed surface further including a second mounting orifice formed therethrough concentric with said second axis and receiving said bolt.

7. A wheel anchored display barrier comprising:
a base with a planar first section and rounded second section, wherein a recess is formed in a top face of said rounded second section;
a lanyard housing comprising a bottom face and an opposing top face, said bottom face disposed in said recess, wherein said lanyard housing contains a self-winding reel substantially centered within said lanyard housing and defining a vertical first axis, wherein a retractable lanyard is wound around said reel, said retractable lanyard being extensible from within said lanyard housing through a housing orifice, and said lanyard housing further comprising a positioning peg extending normally from said top face of said lanyard housing;
an arm rotation assembly comprising a circular disk with a lower surface and an opposing upper surface, wherein said lower surface is slidably engaged with said top face of said lanyard housing, wherein said disk further comprises an arced slot extending therethrough for receiving said positioning peg, and an orifice extending therethrough for passage of said retractable lanyard, said disk being centered on and rotatable about said first axis;
an arm pivot assembly, said arm pivot assembly comprising a lower pivot arm affixed to said upper surface of said disk, and an upper pivot arm pivotably connected to said lower pivot arm about a bolt extending through said upper and lower pivot arms, said bolt defining a second axis substantially perpendicular to said first axis,
a telescoping arm comprising a plurality of tube sections, wherein a lower end of an outermost tube section is attached to said upper pivot arm of said arm pivot assembly, said retractable lanyard being extensible through said telescoping arm;
an attachment ring affixed to an end of said retractable lanyard; and
an attachment fixture affixed to an upper end of an innermost tube of said telescoping arm, said attachment fixture configured to engage with an attachment ring of a retractable lanyard of an adjacent barrier.

8. The wheel anchored display barrier of claim 7 wherein said lower pivot arm of said arm pivot assembly comprises first toothed surface formed on a first vertical face thereof with a first mounting orifice formed therethrough concentric with said second axis and receiving said bolt, and said upper pivot arm of said arm pivot assembly comprises a second toothed surface formed on a second vertical face thereof, said second vertical face being rotatably engaged with said first vertical face, said second toothed surface including a second mounting orifice formed therethrough concentric with said second axis and receiving said bolt.

9. The wheel anchored display barrier of claim 7 wherein said rounded second section further comprises a retention tab for retaining said lanyard housing within said base.

\* \* \* \* \*